(12) United States Patent
Weber

(10) Patent No.: US 10,577,013 B2
(45) Date of Patent: Mar. 3, 2020

(54) STEERING ASSISTANCE SYSTEM FOR AN AGRICULTURAL VEHICLE

(71) Applicant: Deere & Company, Moline, IL (US)

(72) Inventor: Uwe Weber, Rothselberg (DE)

(73) Assignee: DEERE & COMPANY, Moline, IL (US)

( * ) Notice: Subject to any disclaimer, the term of this patent is extended or adjusted under 35 U.S.C. 154(b) by 127 days.

(21) Appl. No.: 15/846,415

(22) Filed: Dec. 19, 2017

(65) Prior Publication Data

US 2018/0170420 A1    Jun. 21, 2018

(30) Foreign Application Priority Data

Dec. 20, 2016  (DE) ........................ 10 2016 225 630

(51) Int. Cl.
| | |
|---|---|
| *B62D 5/04* | (2006.01) |
| *B62D 9/00* | (2006.01) |
| *B62D 6/00* | (2006.01) |
| *B60G 9/02* | (2006.01) |
| *B62D 15/02* | (2006.01) |

(52) U.S. Cl.
CPC ........... *B62D 5/0463* (2013.01); *B60G 9/027* (2013.01); *B62D 6/002* (2013.01); *B62D 6/003* (2013.01); *B62D 9/00* (2013.01); *B62D 15/021* (2013.01); *B62D 15/025* (2013.01); *B60G 2200/324* (2013.01); *B60G 2300/082* (2013.01)

(58) Field of Classification Search
CPC .... B62D 5/0463; B62D 6/002; B62D 15/021; B62D 15/025; B60G 9/027; B60G 2300/082
See application file for complete search history.

(56) References Cited

U.S. PATENT DOCUMENTS

| | | | |
|---|---|---|---|
| 9,561,819 B2 * | 2/2017 | Tuttle | .................. B62D 9/00 |
| 2012/0029771 A1 * | 2/2012 | Mackin | .............. A01D 41/1278 |
| | | | 701/41 |

FOREIGN PATENT DOCUMENTS

| | | |
|---|---|---|
| DE | 19643263 A1 | 4/1998 |
| DE | 10221721 A1 | 11/2003 |
| DE | 102007045781 A1 | 4/2009 |
| DE | 102008055900 A1 | 6/2009 |

(Continued)

OTHER PUBLICATIONS

Translation of DE102007045781A1 (Year: 2007).*

(Continued)

*Primary Examiner* — Faye M Fleming

(57) ABSTRACT

A steering assistance system for an agricultural vehicle includes a rigid axle on which steerable wheels are mounted and which is mounted so as to float relative to a supporting vehicle structure. The system includes a steering angle sensor for detecting a steering angle of the steerable wheels, a swing angle sensor for determining a swing angle of the rigid axle relative to the supporting vehicle structure, an actuating arrangement for influencing the steering angle, and a control unit that calculates a threshold value permissible for the steering angle depending on the detected swing angle. If the detected steering angle exceeds a tolerance range specified for the threshold value, the control unit executes steering interventions for reducing the steering angle by activating the actuating arrangement to satisfy the threshold value.

22 Claims, 1 Drawing Sheet

(56) References Cited

FOREIGN PATENT DOCUMENTS

| DE | 102011084288 | A1 | | 4/2013 | |
|---|---|---|---|---|---|
| EP | 2042407 | A2 | | 4/2009 | |
| EP | 2886419 | A2 | | 6/2015 | |
| JP | 2018008649 | A | * | 1/2018 | ........... B62D 5/0421 |

OTHER PUBLICATIONS

European Search Report issued in counterpart application No. 17204365.5 dated May 25, 2018. (8 pages).
DE Search Report issued in counterpart application No. 102016224753.0 dated Jul. 19, 2017 (10 pages).

* cited by examiner

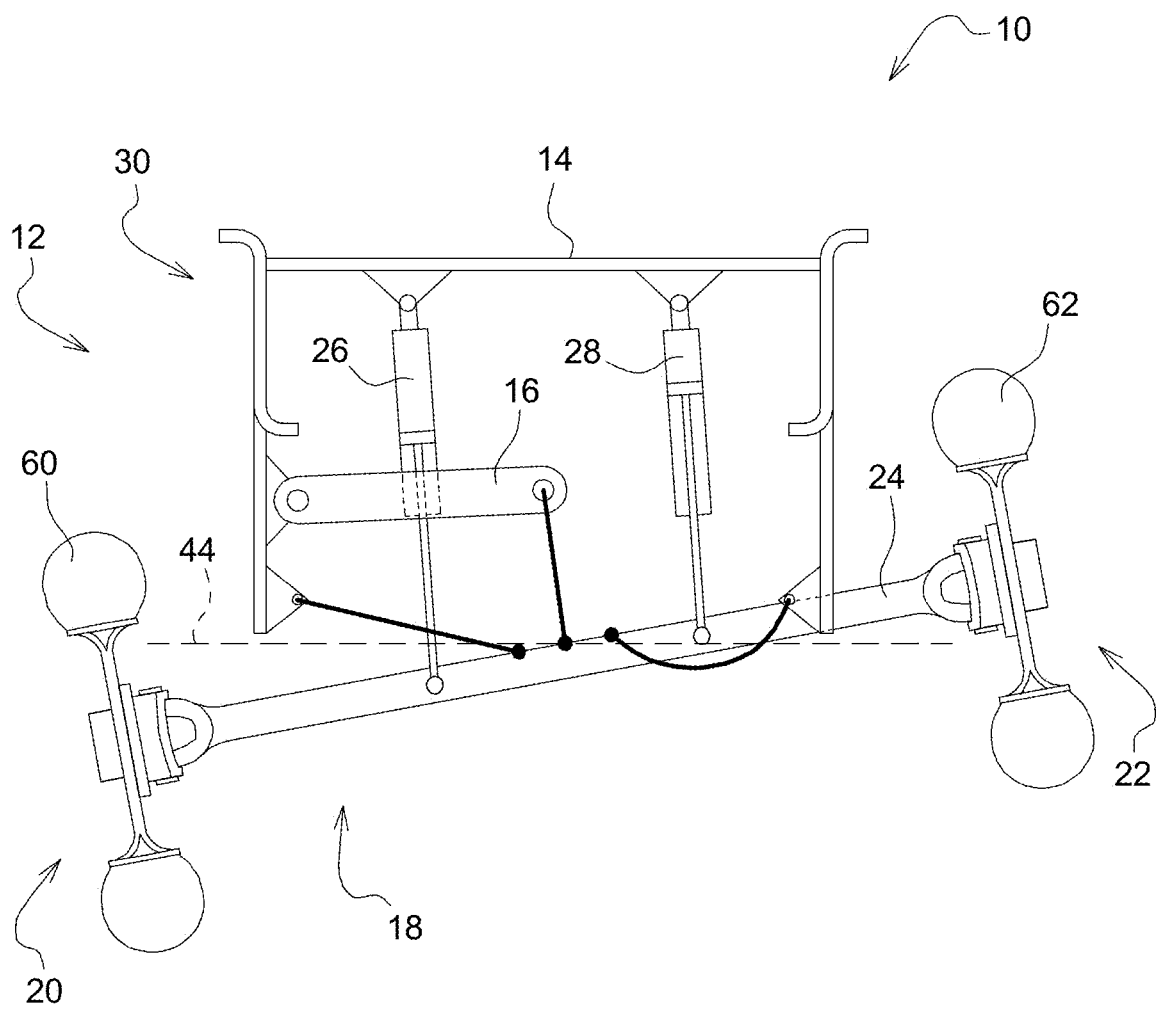
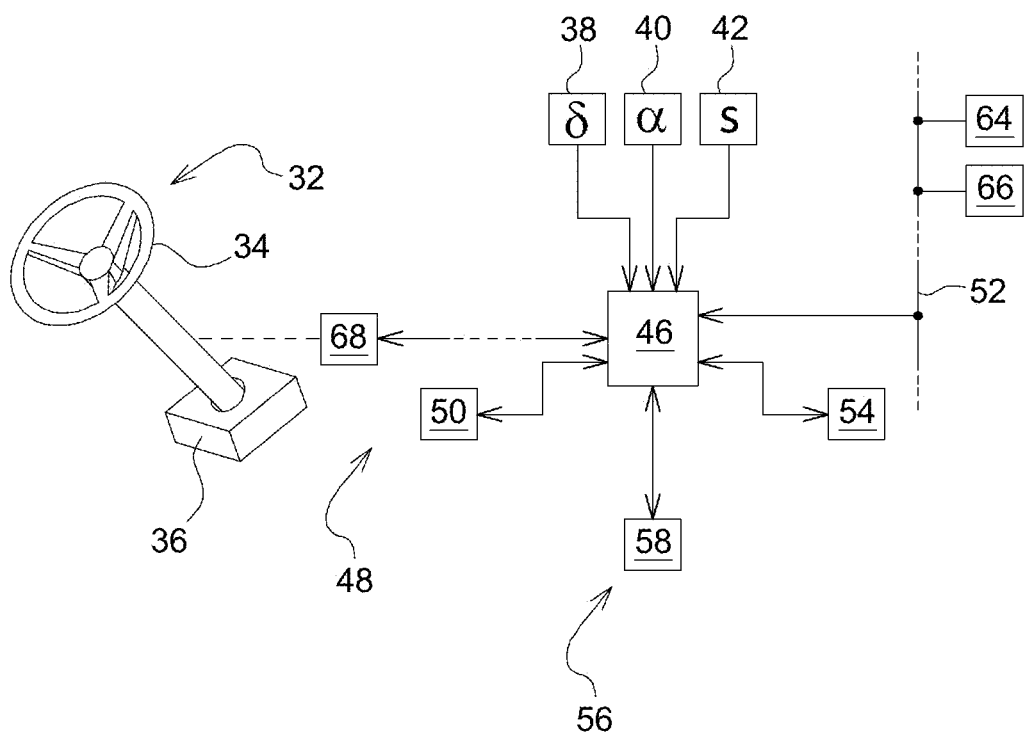

STEERING ASSISTANCE SYSTEM FOR AN AGRICULTURAL VEHICLE

RELATED APPLICATIONS

This application claims priority to German Application Ser. No. 102016225630.0, filed Dec. 20, 2016, the disclosure of which is hereby expressly incorporated by reference in its entirety.

FIELD OF THE DISCLOSURE

The present disclosure relates to a steering system, and in particular, to a steering assistance system for an agricultural vehicle.

BACKGROUND

Agricultural vehicles are usually equipped with a front axle constructed as a rigid floating axle. Structural limitations due to surrounding vehicle parts cause the free space available for mounted front wheels to be more or less limited, at least on the deflected side, depending on the respective steering angle. Under unfavorable conditions there can thus be undesired contact between the front wheel in question and the surrounding vehicle parts.

A need exists therefore for a steering assistance system for an agricultural vehicle that reduces the possibility of an undesired contact between the steerable front wheels and the surrounding vehicle parts for a front axle constructed as a rigid floating axle.

SUMMARY

In one embodiment of the present disclosure, a steering assistance system for an agricultural vehicle includes a rigid axle on which steerable wheels are mounted and which is mounted so as to float relative to a supporting vehicle structure, a steering angle sensor for detecting a steering angle of the steerable wheels, a swing angle sensor for determining a swing angle of the rigid axle relative to the supporting vehicle structure, an actuating arrangement for influencing the steering angle, and a control unit that calculates a threshold value permissible for the steering angle depending on the detected swing angle and taking structural limitations into account, wherein if the detected steering angle exceeds a tolerance range specified for the threshold value, the control unit carries out steering interventions for reducing the steering angle by activating the actuating arrangement with the objective of complying with the permissible threshold value.

In this manner, the probability of an undesired contact of the steerable wheels with the surrounding vehicle parts can be significantly reduced by appropriately specifying the threshold value. The control unit selects a lower magnitude for the threshold value the more severely the rigid axle has deflected, i.e., become inclined in relation to the vehicle horizontal, and different threshold values can be specified for both possible steering directions of the steerable wheels. The relationship between the swing angle detected by sensors and the respective threshold value can be stored in the control unit in the form of a corresponding control curve. The control curve takes into account the specific structural limitations as well as the track width in the region of the steerable wheels of the agricultural vehicle in question. The permissible threshold value is considered maintained if the steering angle assumes it or falls below it.

The agricultural vehicle may be an agricultural tractor, for example, in which the rigid axle is constructed as the front axle on which steerable wheels are mounted. Use in conjunction with other agricultural vehicles is also conceivable so long as they have a floating axle equipped with steerable wheels.

The actuating arrangement is a component of a superimposed steering system for the agricultural vehicle, wherein the steering interventions are accomplished by adjusting the steerable wheels or by a steering manipulator for influencing the steering angle. Such a superimposed steering system is known in agricultural vehicles with the designation "AutoTrac" from the manufacturer John Deere. The steering interventions are done on an automated basis by controlling a corresponding hydraulic pressure on a hydraulic steering cylinder provided for adjusting the wheels.

Additionally or alternatively, the steering interventions could also be accomplished by applying an operation torque to a steering manipulator provided for influencing the steering angle, such that an operator of the steering manipulator is prompted to reduce the steering angle. The steering manipulator is typically a steering wheel, which cooperates with a steering orbitrol to influence the steering angle, the orbitrol in turn being used to control a hydraulic cylinder provided for adjusting the steerable wheels. The operation torque is applied by an electric motor-driven torque transmitter, for example, wherein a (progressively) increasing operation torque in the direction of an increase of the steering angle can be produced on the steering manipulator by means of the torque transmitter, and a (progressively) decreasing operation torque can be produced in the direction of a reduction of the steering angle, so that the operator receives an unmistakable indication to appropriately reduce the steering angle by actuating the steering manipulator. The performance of the actual steering intervention is thus left to the operator so that he retains control over the steering of the agricultural vehicle at all times.

Since noticeable swing angles primarily occur when traveling on uneven terrain and the performance of the above-mentioned steering interventions during road travel should be suppressed for reasons of driving stability, there is the possibility of activating the actuating arrangement only if the control unit determines that a vehicle operating state characteristic of field operation is present.

The control unit can deduce the presence of a vehicle operating state characteristic of field operation by evaluating an instantaneous travel speed or transmission ratio of the agricultural vehicle, an instantaneous vehicle position, or parameters that characterize the operating state of units provided for cultivation. In this case, the instantaneous vehicle position obtained from GPS information is compared by the control unit to cartographic terrain data in which field areas, service roads and the like are recorded. The units provided for cultivation can additionally be a power takeoff, a three-point hitch or devices for carrying out various cultivation functions, the latter being associated with an implement that can be attached to the agricultural vehicle. If the implement is ISO-capable, the respective operating state can be easily obtained via an ISO interface communicating with the control unit.

Activation of the actuating arrangement can also be subject to a user enable signal transmitted to the control unit via a user interface. In the simplest case, the user interface is an operating element by means of which the functions performed by the steering assistance system can be switched on and off.

In some agricultural vehicles, the rigid axle is also resiliently suspended relative to the supporting vehicle structure, in which case the control unit can modify the calculation of the permissible threshold value for the steering angle according to an axle position relative to the supporting vehicle structure as detected by a position sensor, in order to be able to take appropriate account of the changes in the amount of free space available for the steerable wheels.

Similar considerations also apply with respect to the geometry of the tires used on the steerable wheels, particularly with regard to the width or diameter thereof, which follows from the tire type or tire model. In this respect it is possible for the control unit to take account of the tire type or tire model in use when calculating the permissible threshold values for the steering angle. The calculation can include the tire pressure as well as the resulting values for width or diameter of the tire. The information regarding the tire pressure can be provided, for example, by a tire pressure monitoring system or a central tire inflation system.

The tire type or the tire model can be input via a user interface communicating with the control unit, for example, via a touch-sensitive display screen surface comprised by the interface, via which the tire type or the tire model can be selected by the operator from a list provided for the agricultural vehicle in question.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE is a schematic of a steering assistance system for an agricultural vehicle.

DETAILED DESCRIPTION

The steering assistance system 12 housed in the agricultural tractor 10 includes a rigid axle 18 which is mounted via a crossmember 16 so as to be able to float relative to the supporting vehicle structure 14 and has steerable wheels 20, 22. The rigid axle 18 in the present case is a front axle 24 of the agricultural tractor 10, which is suspended resiliently in the vertical direction relative to the supporting vehicle structure 14 by means of associated hydraulic cylinders 26, 28. The hydraulic cylinders 26, 28 are a component of a hydraulic front axle suspension system 30 similar to that shown in DE 196 43 263 A1. The steerable wheels 20, 22 are attached via respective steering knuckles to the ends of the front axle 24, adjustably with respect to their steering angle by the operator by means of the steering manipulator 32. The steering manipulator 32 is a steering wheel 34, which cooperates with a steering orbitrol 36 to influence the steering angle δ, the orbitrol being used in turn to control a hydraulic cylinder (not shown) provided for adjusting the steerable wheels 20, 22.

In addition, a steering angle sensor 38 for determining a steering angle δ at the steerable wheels 20, 22 is present, as well as a swing angle sensor 40 for determining a swing or oscillation angle α of the front axle 24 relative to the supporting vehicle structure 14, and a position sensor 42 for determining an axle position s relative to the supporting vehicle structure 14. The swing or oscillation angle α designates a transverse inclination of the front axle 24 relative to the vehicle horizontal line 44. The measurement data provided by the sensors 38, 40, 42 are supplied to an electronic control unit 46 for evaluation.

An actuating arrangement 48 makes it possible to influence the steering angle δ by performing appropriate steering interventions. The actuating arrangement 48 in the present case is a component of a superimposed steering system 50 of the agricultural tractor 10, wherein the steering interventions are accomplished by adjusting the steerable wheels 20, 22 or by the steering manipulator 34 provided for influencing the steering angle δ. Such a superimposed steering system 50 is known in agricultural tractors with the designation "AutoTrac" from the manufacturer John Deere. The steering interventions are done on an automated basis by controlling a corresponding hydraulic pressure on the hydraulic steering cylinder provided for adjusting the wheels 20, 22.

Depending on the detected swing angle α and the detected axle position s, the control unit 46 calculates a permissible threshold value for the steering angle δ, taking into consideration structural limitations. If the control unit 46 determines that the detected steering angle δ exceeds a tolerance range provided for the threshold value, the control unit carries out steering interventions by appropriate activation of the actuating unit 48 for the purpose of reducing the steering angle δ, with the objective that the permissible threshold value be maintained. The permissible threshold value is considered maintained if the steering angle δ assumes it or falls below it.

The probability of an undesired contact of the steerable wheels 20, 22 with the surrounding vehicle parts can be significantly reduced by appropriately specifying the threshold value. The control unit 46 selects a lower magnitude for the threshold value the more severely the front axle 24 has deflected, i.e., become inclined in relation to the vehicle horizontal 44, and different threshold values can be specified for both possible steering directions of the steerable wheels 20, 22. The relationship between the swing angle α detected by sensors and the respective threshold value can be stored in the control unit 46 in the form of a corresponding control curve. The control curve takes into account the specific structural limitations as well as the track width in the region of the steerable wheels 20, 22 of the agricultural tractor 10 in question.

Since noticeable swing angles primarily occur when traveling on uneven terrain and the performance of the above-mentioned steering interventions during road travel should be suppressed for reasons of driving stability, the actuating arrangement 48 is activated only if the control unit 46 determines that a vehicle operating state characteristic of field operation is present.

The control unit 46 deduces the presence of a vehicle operating state characteristic of field operation by evaluating an instantaneous travel speed or transmission ratio of the tractor 10, an instantaneous vehicle position, or parameters that characterize the operating state of units provided for cultivation. In this case, the instantaneous vehicle position obtained from GPS information is compared by the control unit 46 to cartographic terrain data in which field areas, work roads and the like are recorded. The units provided for cultivation can additionally be a power takeoff, a three-point hitch or equipment for carrying out various cultivation functions, the latter being associated with an implement that can be attached to the agricultural tractor 10. The corresponding information is available on a (CAN) data bus 52 of the agricultural tractor 10. If there is an ISOBUS-capable implement, the respective operating state thereof is also available via an ISOBUS interface 54 communicating with the control unit 46.

Activation of the actuating arrangement 48 is also subject to a user enable signal transmitted to the control unit 46 via a user interface 56. The simplest user interface 56 is an operating element overlaid on a touch-sensitive display surface 58, by means of which the functions performed by the steering assistance system 12 can be switched on and off.

The geometry of the tires 60, 62 used on the steerable wheels 20, 22, particularly the width or diameter thereof, which can be deduced from the tire type or tire model, likewise has an influence on the space available to the steerable wheels 20, 22. The control unit 46 therefore additionally takes the tire type or tire model in use into account when calculating the threshold value permissible for the steering angle δ. The calculation includes the tire pressure as well as the resulting values for width or diameter of the tire 60, 62. The information regarding the tire pressure is provided by a tire pressure monitoring system 64 or by a central tire inflation system 66 via a (CAN) data bus 52 of the agricultural tractor 10.

The tire type or the tire model is input via the user interface 56 communicating with the control unit 46, more precisely, via a touch-sensitive display screen surface 58 comprised by the interface, via which the tire type or the tire model can be selected by the operator from a list provided for the agricultural tractor 10 in question.

According to an alternative embodiment of the steering assistance system 12, the steering interventions are performed by applying an operation torque to the steering wheel 34 provided for influencing the steering angle δ, and specifically in such a manner that an operator of the steering wheel 34 is prompted to reduce the steering angle δ. The operation torque is applied by an electric motor-driven torque transmitter 68, for example, wherein a (progressively) increasing operation torque in the direction of an increase of the steering angle δ can be produced on the steering wheel 34 by means of the torque transmitter 68 and a (progressively) decreasing operation torque can be produced in the direction of a reduction of the steering angle δ, so that the operator receives an unmistakable indication to appropriately reduce the steering angle δ by actuating the steering wheel 34. The performance of the actual steering intervention thus remains at the discretion of the user and therefore he retains control of the steering of the agricultural tractor 10 at all times.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A steering assistance system for an agricultural vehicle, comprising:
   a rigid axle mounted to a supporting vehicle structure so as to float relative thereto;
   steerable wheels mounted to the rigid axle;
   a steering angle sensor for detecting a steering angle of the steerable wheels;
   a swing angle sensor for determining a swing angle of the rigid axle relative to the supporting vehicle structure;
   an actuating arrangement for influencing the steering angle; and
   a control unit configured to calculate a threshold value permissible for the steering angle based on the detected swing angle;
   wherein if the detected steering angle exceeds a tolerance range specified for the threshold value, the control unit is configured to execute steering interventions for reducing the steering angle by activating the actuating arrangement to comply with the permissible threshold value; and
   wherein the steering interventions are executed by applying an operation torque to a steering manipulator of the agricultural vehicle for influencing the steering angle.

2. The steering assistance system of claim 1, wherein:
   the actuating arrangement comprises a component of a superimposed steering system;
   the steering interventions being executed to adjust the steerable wheels or a steering manipulator for influencing the steering angle.

3. The steering assistance system of claim 1, wherein the actuating arrangement is only activated if the control unit determines that a vehicle operating state characteristic of field operation is present.

4. The steering assistance system of claim 3, wherein the control unit determines the presence of the vehicle operating state characteristic of field operation by evaluating an instantaneous travel speed or transmission ratio of the agricultural vehicle, an instantaneous vehicle position, or parameters that characterize the operating state of units provided for cultivation.

5. The steering assistance system of claim 1, wherein the actuating arrangement is activated subject to an operator enable signal transmitted via a user interface to the control unit.

6. The steering assistance system of claim 1, wherein:
   the rigid axle is resiliently suspended relative to the supporting vehicle structure,
   the control unit configured to modify the calculation of the permissible threshold value for the steering angle according to an axle position relative to the supporting vehicle structure as detected by a position sensor.

7. The steering assistance system of claim 1, wherein the control unit receives information about a tire type or a tire model that is used when calculating the threshold value permissible for the steering angle.

8. The steering assistance system of claim 7, wherein the information about the tire type or tire model is input via a user interface in communication with the control unit.

9. An agricultural vehicle, comprising:
   a rigid axle mounted to a supporting vehicle structure so as to float relative thereto;
   steerable wheels mounted to the rigid axle;
   a steering angle sensor for detecting a steering angle of the steerable wheels;
   a swing angle sensor for determining a swing angle of the rigid axle relative to the supporting vehicle structure;
   an actuating arrangement for influencing the steering angle; and
   a control unit configured to calculate a threshold value permissible for the steering angle based on the detected swing angle;
   wherein if the detected steering angle exceeds a tolerance range specified for the threshold value, the control unit is configured to execute steering interventions for reducing the steering angle by activating the actuating arrangement to comply with the permissible threshold value; and wherein the steering interventions are executed by applying an operation torque to a steering manipulator of the agricultural vehicle for influencing the steering angle.

10. The agricultural vehicle of claim 9, wherein:
the actuating arrangement comprises a component of a superimposed steering system;
the steering interventions being executed to adjust the steerable wheels or a steering manipulator for influencing the steering angle.

11. The agricultural vehicle of claim 9, wherein the actuating arrangement is only activated if the control unit determines that a vehicle operating state characteristic of field operation is present.

12. The agricultural vehicle of claim 11, wherein the control unit determines the presence of the vehicle operating state characteristic of field operation by evaluating an instantaneous travel speed or transmission ratio of the agricultural vehicle, an instantaneous vehicle position, or parameters that characterize the operating state of units provided for cultivation.

13. The agricultural vehicle of claim 9, wherein the actuating arrangement is activated subject to an operator enable signal transmitted via a user interface to the control unit.

14. The agricultural vehicle of claim 9, wherein:
the rigid axle is resiliently suspended relative to the supporting vehicle structure,
the control unit configured to modify the calculation of the permissible threshold value for the steering angle according to an axle position relative to the supporting vehicle structure as detected by a position sensor.

15. The agricultural vehicle of claim 9, wherein the control unit receives information about a tire type or a tire model that is used when calculating the threshold value permissible for the steering angle.

16. The agricultural vehicle of claim 15, wherein the information about the tire type or tire model is input via a user interface in communication with the control unit.

17. A steering assistance system for an agricultural vehicle, comprising:
a rigid axle mounted to a supporting vehicle structure so as to float relative thereto;
steerable wheels mounted to the rigid axle;
a steering angle sensor for detecting a steering angle of the steerable wheels;
a swing angle sensor for determining a swing angle of the rigid axle relative to the supporting vehicle structure;
an actuating arrangement for influencing the steering angle; and
a control unit configured to calculate a threshold value permissible for the steering angle based on the detected swing angle;
wherein if the detected steering angle exceeds a tolerance range specified for the threshold value, the control unit is configured to execute steering interventions for reducing the steering angle by activating the actuating arrangement to comply with the permissible threshold value; and
wherein the actuating arrangement is only activated if the control unit determines that a vehicle operating state characteristic of field operation is present.

18. A steering assistance system for an agricultural vehicle, comprising:
a rigid axle mounted to a supporting vehicle structure so as to float relative thereto;
steerable wheels mounted to the rigid axle;
a steering angle sensor for detecting a steering angle of the steerable wheels;
a swing angle sensor for determining a swing angle of the rigid axle relative to the supporting vehicle structure;
an actuating arrangement for influencing the steering angle; and
a control unit configured to calculate a threshold value permissible for the steering angle based on the detected swing angle;
wherein if the detected steering angle exceeds a tolerance range specified for the threshold value, the control unit is configured to execute steering interventions for reducing the steering angle by activating the actuating arrangement to comply with the permissible threshold value; and
wherein the control unit receives information about a tire type or a tire model that is used when calculating the threshold value permissible for the steering angle.

19. The steering assistance system of claim 18, wherein the information about the tire type or tire model is input via a user interface in communication with the control unit.

20. An agricultural vehicle, comprising:
a rigid axle mounted to a supporting vehicle structure so as to float relative thereto;
steerable wheels mounted to the rigid axle;
a steering angle sensor for detecting a steering angle of the steerable wheels;
a swing angle sensor for determining a swing angle of the rigid axle relative to the supporting vehicle structure;
an actuating arrangement for influencing the steering angle; and
a control unit configured to calculate a threshold value permissible for the steering angle based on the detected swing angle;
wherein if the detected steering angle exceeds a tolerance range specified for the threshold value, the control unit is configured to execute steering interventions for reducing the steering angle by activating the actuating arrangement to comply with the permissible threshold value; and
wherein the actuating arrangement is only activated if the control unit determines that a vehicle operating state characteristic of field operation is present.

21. An agricultural vehicle, comprising:
a rigid axle mounted to a supporting vehicle structure so as to float relative thereto;
steerable wheels mounted to the rigid axle;
a steering angle sensor for detecting a steering angle of the steerable wheels;
a swing angle sensor for determining a swing angle of the rigid axle relative to the supporting vehicle structure;
an actuating arrangement for influencing the steering angle; and
a control unit configured to calculate a threshold value permissible for the steering angle based on the detected swing angle;
wherein if the detected steering angle exceeds a tolerance range specified for the threshold value, the control unit is configured to execute steering interventions for reducing the steering angle by activating the actuating arrangement to comply with the permissible threshold value; and wherein the control unit receives information about a tire type or a tire model that is used when calculating the threshold value permissible for the steering angle.

22. The agricultural vehicle of claim 21, wherein the information about the tire type or tire model is input via a user interface in communication with the control unit.

* * * * *